(12) United States Patent
Hahn et al.

(10) Patent No.: US 7,417,920 B2
(45) Date of Patent: Aug. 26, 2008

(54) RECIPROCATING PULSER FOR MUD PULSE TELEMETRY

(75) Inventors: Detlef Hahn, Hannover (DE); Volker Peters, Wienhausen (DE); Cedric Rouatbi, Celle (DE); Eckard Scholz, Eldingen (DE)

(73) Assignee: Baker Hughes Incorporated, Houston, TX (US)

( * ) Notice: Subject to any disclaimer, the term of this patent is extended or adjusted under 35 U.S.C. 154(b) by 439 days.

(21) Appl. No.: 11/136,147

(22) Filed: May 24, 2005

(65) Prior Publication Data

US 2005/0260089 A1 Nov. 24, 2005

Related U.S. Application Data (63) Continuation-in-part of application No. 10/096,451, filed on Mar. 12, 2002, now Pat. No. 6,898,150.

(60) Provisional application No. 60/275,342, filed on Mar. 13, 2001.

(51) Int. Cl.
*E21B 47/18* (2006.01)

(52) U.S. Cl. .............................. 367/85; 367/81; 367/83; 175/40

(58) Field of Classification Search .................. 367/85, 367/83, 81; 137/269; 175/40, 57
See application file for complete search history.

(56) References Cited

U.S. PATENT DOCUMENTS

| | | | |
|---|---|---|---|
| 2,759,143 A | 8/1956 | Arps | |
| 3,065,416 A | 11/1962 | Jeter | |
| 3,741,321 A | 6/1973 | Slover, Jr. et al. | |
| 3,764,968 A | 10/1973 | Anderson | |
| 3,958,217 A | 5/1976 | Spinnler | |
| 4,215,427 A | 7/1980 | Waggener et al. | |
| 4,266,606 A | 5/1981 | Stone | |
| 4,351,037 A | 9/1982 | Scherbatskoy | |
| 4,519,574 A | 5/1985 | Roper | |
| 4,802,150 A | 1/1989 | Russell et al. | |
| 4,901,290 A | 2/1990 | Feld et al. | |
| 4,953,595 A | 9/1990 | Kotlyar | |
| 5,055,837 A | 10/1991 | Abdallah et al. | |
| 5,079,750 A | 1/1992 | Scherbatskoy | |
| 5,103,430 A | 4/1992 | Jeter et al. | |

(Continued)

FOREIGN PATENT DOCUMENTS

EP 0617196 A2 9/1994

(Continued)

*Primary Examiner*—Albert K. Wong
(74) *Attorney, Agent, or Firm*—Madan Mossman and Sriram (57) ABSTRACT

A method of transmitting pressure pulses from a downhole location through a flowing fluid in a wellbore comprises using a linear actuator to controllably move a reciprocating member axially back and forth between a first position and a second position to at least partially obstruct flow of the flowing fluid to generate the pressure pulses. A reciprocating pulser for generating pressure pulses in a fluid flowing in a wellbore, comprises a fluid passage that allows flow of the fluid through the pulser, and a reciprocating member. A linear actuator is coupled to the reciprocating member, such that the linear actuator moves the reciprocating member in a first axial direction and then in a reverse direction to at least partially obstruct flow of the fluid through the pulser to generate pressure pulses in the flowing fluid.

26 Claims, 10 Drawing Sheets

U.S. PATENT DOCUMENTS

| | | | |
|---|---|---|---|
| 5,115,415 A | 5/1992 | Mumby et al. | |
| 5,473,579 A | 12/1995 | Jeter | |
| 5,583,827 A | 12/1996 | Chin | |
| 5,586,084 A | 12/1996 | Barron et al. | |
| 5,787,052 A * | 7/1998 | Gardner et al. | 367/84 |
| 5,802,011 A | 9/1998 | Winters et al. | |
| 5,836,353 A | 11/1998 | Van Steenwyk | |
| 6,002,643 A * | 12/1999 | Tchakarov et al. | 367/85 |
| 6,097,310 A | 8/2000 | Harrell et al. | |
| 6,469,637 B1 | 10/2002 | Seyler et al. | |
| 6,626,253 B2 | 9/2003 | Hahn et al. | |
| 6,898,150 B2 * | 5/2005 | Hahn et al. | 367/85 |
| 2004/0069535 A1 | 4/2004 | Hahn et al. | |

FOREIGN PATENT DOCUMENTS

| | | |
|---|---|---|
| GB | 2250320 | 6/1992 |
| WO | WO02072993 | 9/2002 |

* cited by examiner

RECIPROCATING PULSER FOR MUD PULSE TELEMETRY

CROSS REFERENCE TO RELATED APPLICATIONS

This application is a Continuation-In-Part of prior application Ser. No. 10/096,451, filed Mar. 12, 2002, now U.S. Pat. No. 6,898,150, which claims the benefit of U.S. Provisional Application No. 60/275,342 filed on Mar. 13, 2001, both of which are incorporated herein by reference.

BACKGROUND OF THE INVENTION

1. Field of the Invention

The present invention relates to drilling fluid telemetry systems and, more particularly, to a telemetry system incorporating a reciprocating pulser system for modulating the pressure of a drilling fluid circulating in a drill string within a well bore.

2. Description of the Related Art

Drilling fluid telemetry systems, generally referred to as mud pulse systems, are particularly adapted for telemetry of information from the bottom of a borehole to the surface of the earth during oil well drilling operations. The information telemetered often includes, but is not limited to, parameters of pressure, temperature, direction and deviation of the well bore. Other parameters include logging data such as resistivity of the various layers, sonic density, porosity, induction, self potential and pressure gradients. This information is critical to efficiency in the drilling operation.

The oil drilling industry needs to effectively increase mud pulse data transmission rates to accomodate the ever increasing amount of measured downhole data. The major disadvantage of available mud pulse valves is the low data transmission rate. Increasing the data rate with available valve types leads to unacceptably large power consumption, unacceptable pulse distortion, or may be physically impractical due to erosion, washing, and abrasive wear. Because of their low activation speed, nearly all existing mud pulse valves are only capable of generating discrete pulses. To effectively use carrier waves to send frequency shift (FSK) or phase shift (PSK) coded signals to the surface, the actuation speed must be increased and actuation fully controlled.

Mud pulse valves, also called pulsers, must operate under extremely high static downhole pressures, high temperatures, high flow rates and various erosive flow types. At these conditions, the valve must be able to create pressure pulses of around 100-300 psi.

Different types of valve systems are used to generate downhole pressure pulses. Valves that open and close a bypass from the inside of the drill string to the wellbore annulus create negative pressure pulses, for example see U.S. Pat. No. 4,953,595. Valves that use a controlled restriction placed in the circulating mud stream are commonly referred to as positive pulse systems, for example see U.S. Pat. No. 3,958,217.

Another example of a negative pulsing valve is illustrated in U.S. Pat. No. 4,351,037. This technology includes a downhole valve for venting a portion of the circulating fluid from the interior of the drill string to the annular space between the pipe string and the borehole wall. Drilling fluids are circulated down the inside of the drill string, out through the drill bit and up the annular space to surface. By momentarily venting a portion of the fluid flow out a lateral port, an instantaneous pressure drop is produced and is detectable at the surface to provide an indication of the downhole venting. A downhole instrument is arranged to generate a signal or mechanical action upon the occurrence of a downhole detected event to produce the above described venting. The downhole valve disclosed is defined in part by a valve seat, or nozzle, having an inlet and outlet and a valve stem movable to and away from the inlet end of the valve seat in a linear path with the drill string.

All negative pulsing valves need a certain high differential pressure below the valve to create sufficient pressure drop when the valve is open. Because of this high differential pressure, negative pulse valves are more prone to washing. In general, it is not desirable to bypass flow above the bit into the annulus. Therefore it must be ensured that the valve is able to completely close the bypass. With each actuation, the valve hits against the valve seat. Because of this impact, negative pulsing valves are more prone to mechanical and abrasive wear than positive pulsing valves.

Positive pulsing valves might, but do not need to, fully close the flow path for operation. Positive poppet type valves are less prone to wear out the valve seat. The main forces acting on positive poppet valves are hydraulic forces, because the valves open or close axially against the flow stream. To reduce the actuation power some poppet valves are hydraulically powered as shown in U.S. Pat. No. 3,958,217. Hereby the main valve is indirectly operated by a pilot valve. The low power consumption pilot valve closes a flow restriction, which activates the main valve to create the pressure drop. The power consumption of this kind of valve is very small. The disadvantage of this valve is the passive operated main valve. With high actuation rates the passive main valve is not able to follow the actively operated pilot valve. The pulse signal generated is highly distorted and hardly detectable at the surface.

Commonly, rotating disc valves open and close flow channels perpendicular to the flow stream, such that thrust bearings support a portion of the hydraulic forces. With increasing actuation speed, dynamic forces of inertia are the main power consuming forces. U.S. Pat. No. 3,764,968 describes a rotating valve for the purpose to transmit frequency shift key (FSK) or phase shift key (PSK) coded signals. The valve uses a rotating disc and a non-rotating stator with a number of corresponding slots. The rotor is continuously driven by an electrical motor. Depending on the motor speed, a certain frequency of pressure pulses are created in the flow as the rotor intermittently interrupts the fluid flow. Motor speed changes are required to change the pressure pulse frequency to allow FSK or PSK type signals. There are several pulses per rotor revolution, corresponding to the number of slots in the rotor and stator. To change the phase or frequency requires the rotor to increase or decrease in speed. This may take a rotor revolution to overcome the rotational inertia and to achieve the new phase or frequency, thereby requiring several pulse cycles to make the transition. Amplitude coding of the signal is inherently not possible with this kind of continuously rotating device. In order to change the frequency or phase, large moments of inertia, associated with the motor, must be overcome, requiring a substantial amount of power. When continuously rotated at a certain speed, a turbine might be used or a gear might be included to reduce power consumption of the system. On the other hand, both options dramatically increase the inertia and power consumption of the system when changing form one to another speed for signal coding.

The aforesaid examples illustrate some of the critical considerations that exist in the application of a fast acting valve for generating a pressure pulse. Other considerations in the use of these systems for borehole operations involve the extreme impact forces, dynamic (vibrational) energies, existing in a moving drill string. The result is excessive wear, fatigue, and failure in operating parts of the system. The particular difficulties encountered in a drill string environment, including the requirement for a long lasting system to prevent premature malfunction and replacement of parts, require a robust and reliable valve system.

The methods and apparatus of the present invention overcome the foregoing disadvantages of the prior art by providing a novel mud pulse telemetry system utilizing a reciprocating poppet type valve.

SUMMARY OF THE INVENTION

The present invention contemplates a mud pulse telemetry system utilizing a reciprocating pulser system for generating pressure pulses in the drilling fluid circulating in a drill string in a well bore.

In one aspect, a method of transmitting pressure pulses from a downhole location through a flowing fluid in a wellbore, comprises using a linear actuator to controllably move a reciprocating member axially back and forth between a first position and a second position to at least partially obstruct flow of the flowing fluid to generate the pressure pulses.

In another aspect, a reciprocating pulser for generating pressure pulses in a fluid flowing in a wellbore, comprises a fluid passage that allows flow of the fluid through the pulser, and a reciprocating member. A linear actuator is coupled to the reciprocating member, such that the linear actuator moves the reciprocating member in a first axial direction and then in a reverse direction to at least partially obstruct flow of the fluid through the pulser to generate pressure pulses in the flowing fluid.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the embodiment, taken in conjunction with the accompanying drawings, in which like elements have been given like numerals, wherein.

DESCRIPTION OF EMBODIMENTS

Figure 1:
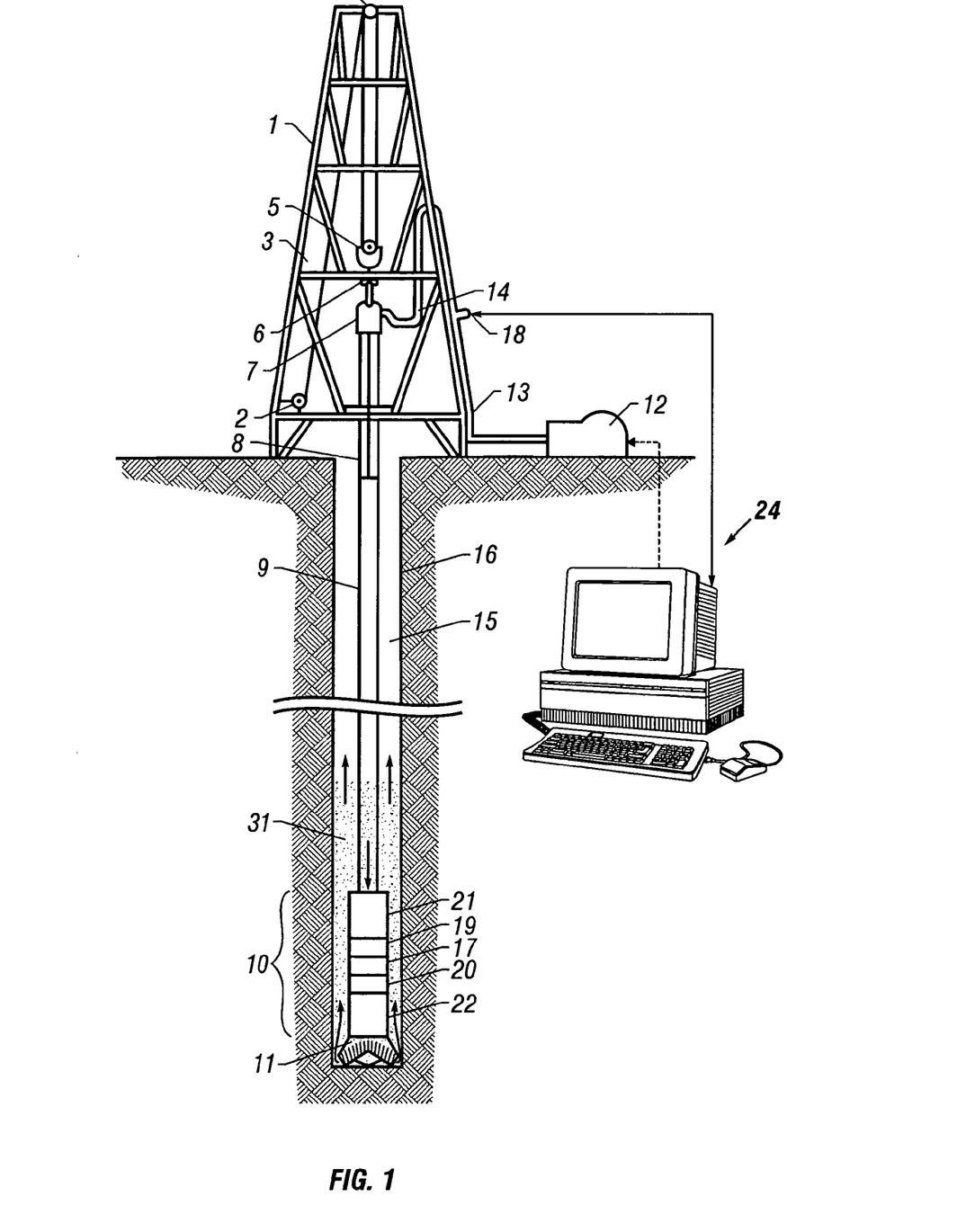
FIG. 1 is a schematic diagram showing a drilling rig 1 engaged in drilling operations.

FIG. 1 is a schematic diagram showing a drilling rig 1 engaged in drilling operations. Drilling fluid 31, also called drilling mud, is circulated by pump 12 through the drill string 9 down through the bottom hole assembly (BHA) 10, through the drill bit 11 and back to the surface through the annulus 15 between the drill string 9 and the borehole wall 16. The BHA 10 may comprise any of a number of sensor modules 17,20,22 which may include formation evaluation sensors and directional sensors. These sensors are well known in the art and are not described further. BHA 10 may also comprise tools (not separately shown) for adjusting the drilling direction of BHA 10. BHA 10 also contains a pulser system 19 which induces pressure fluctuations in the mud flow. The pressure fluctuations, or pulses, propagate to the surface through the mud flow in the drill string 9 and are detected at the surface by a sensor 18 and a control unit 24. The sensor 18 is connected to the flow line 13 and may be a pressure transducer, a flow transducer, or a combination of a pressure transducer and a flow transducer. Sensor 18 may comprise multiple sensors of the same type and/or a combinations of different types of sensors.

Figure 2:
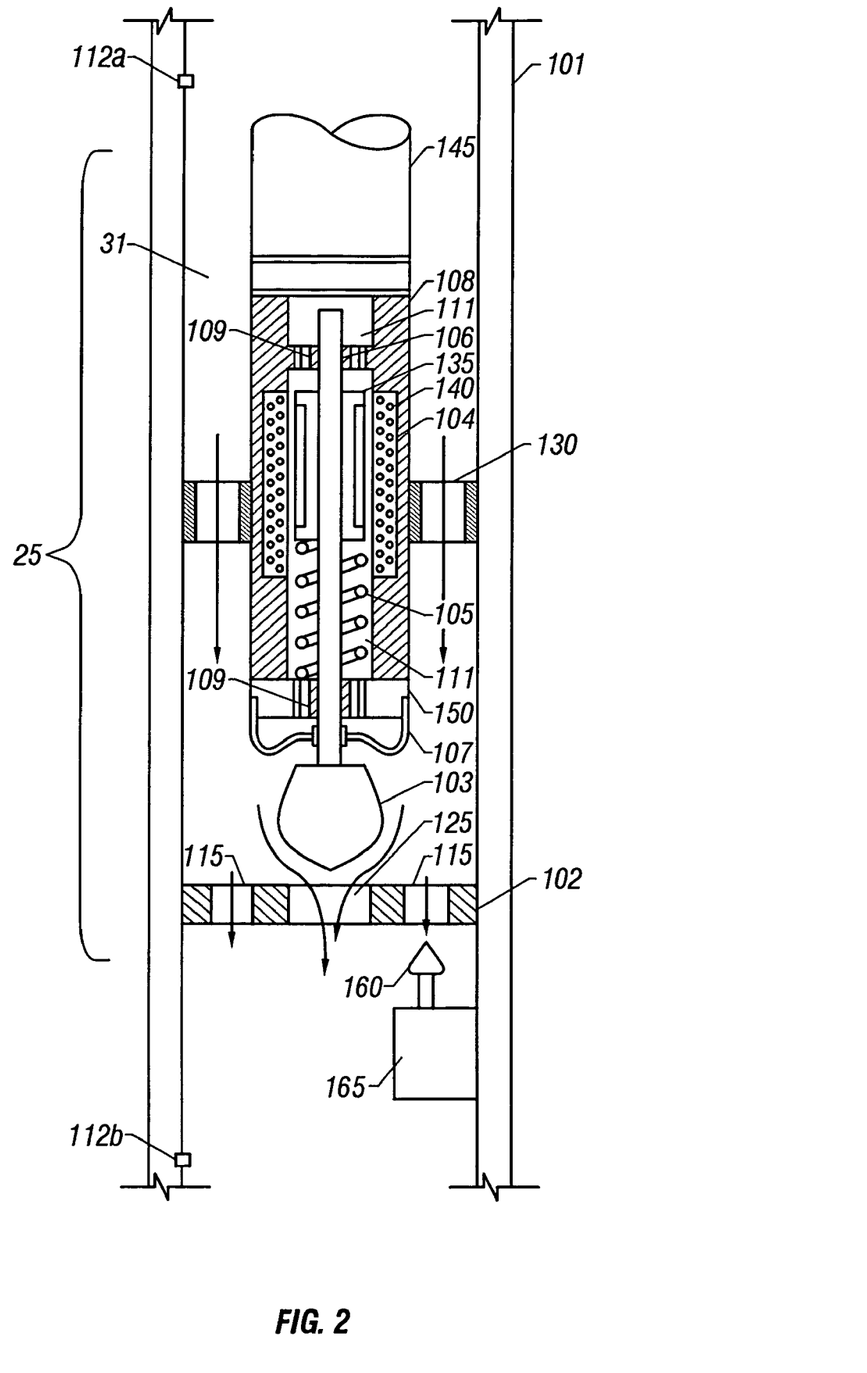
FIG. 2 is a schematic of a reciprocating pulser system according to one embodiment of the present invention.

FIG. 2 is a schematic view of a reciprocating pulser system for mud pulse telemetry. The reciprocating pulser assembly 25, also called a reciprocating pulser or reciprocating valve, is located in the inner bore of the tool housing 101. The housing 101 may be a bored drill collar adapted to fit into the BHA 10, or, alternatively, a separate housing adapted to fit into a drill collar bore. The nozzle assembly 102 is disposed in the flow path and is adapted to be attached to the tool housing 101 at a fixed location so as to constrain the drilling fluid 31 to flow through holes, also called nozzles or orifices, in the nozzle assembly 102. The nozzle assembly 102 has a main nozzle 125 and at least one bypass nozzle 115 equally spaced at a radial distance from the center of the main nozzle 125. In one embodiment, the main nozzle 125 and the bypass nozzle 115 are holes bored through the body of the nozzle assembly 102. In another embodiment, the holes in the nozzle assembly are adapted to accept erosion resistant sleeves (not shown). The sleeves may be of a relatively hard material, such as tungsten or tungsten carbide, or alternately, steel sleeves may be coated with a hard material, such as tungsten carbide. Such materials and coatings are commercially available and will not be discussed further. The sleeve flow passage may be straight or tapered.

A reciprocating member, such as poppet 103, is attached to the shaft 106 and is axially driven by the linear motor 104 in a reciprocating motion. The poppet 103 is positioned such that at one end of the reciprocating motion, also called travel or stroke, the poppet 103 is in close proximity to the main nozzle 125 opening, thereby restricting the flow through the main nozzle 125 and generating an increase in the upstream pressure. The poppet 103 is then driven away from the main nozzle 125 to the other end of the reciprocating motion which results in a decrease in the upstream pressure. The reciprocating motion thereby generates pressure fluctuations, or pulses, in the drilling fluid 31. The motor 104 is contained in and attached to the bearing housing 108. The shaft 106 is attached to the motor 104 and supported by oil-lubricated bearings 109 at each end of the bearing housing 108. The bearings 109 may be linear sleeve type bearings or, alternatively, linear ball bushings. The bearing housing 108 is attached to the support ring 130 and the support ring is, in turn, attached to the tool housing 101. The support ring 130 has a number of holes or slots to allow the drilling fluid 31 to pass through. Linear motor 104 comprises a magnet carrier 135 attached to the shaft 106 with a coil 140 of electrical wire mounted on the inner diameter of the bearing housing 108 and surrounding the magnet carrier 135. The magnet carrier 135 and the coil 140 are sized so that the magnet carrier is able to freely move within the coil 140 and there is no physical interference between them. An electronics module 145 provides electrical signals to the coil 140 to accurately drive the magnet carrier-shaft-poppet combination in a linearly oscillating motion. Henceforth in this discussion, motion of the poppet is taken to mean motion of the magnet carrier 135-shaft 106-poppet 103 combination. Linear electric motors are commercially available and will not be discussed further. The electronics module 145 contains a processor and suitable circuitry, acting according to programmed instructions, which provide control signals to the linear motor. A linear motion measuring sensor (not shown) is located inside the linear motor 104 and provides position measurement to the electronics module 145 to facilitate feedback control of the motion of the poppet 103.

The entire pulser housing 108 is filled with appropriate lubricant 111 to lubricate the bearings 109 and to pressure compensate the internal pulser housing 108 pressure with the downhole pressure of the drilling mud 31. The seal 107 is a flexible bellows seal directly coupled to the shaft 106 and the pulser end cap 150 and hermetically seals the oil filled pulser housing 108. The linear movement of the shaft 106 causes the flexible material of the bellows seal 107 to deform thereby accommodating the linear motion. The flexible bellows material may be an elastomeric material or, alternatively, a fiber reinforced elastomeric material. Alternatively, a flexible metal bellows may be used.

Figure 3:
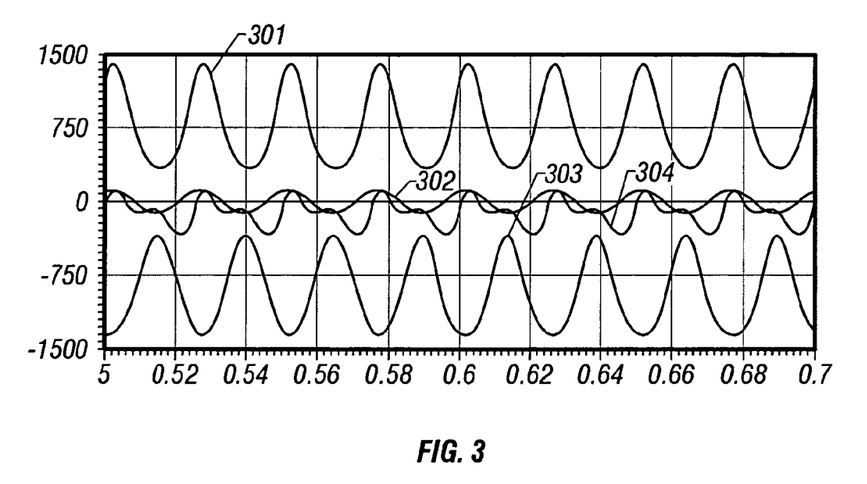
FIG. 3 is a graph of the forces acting on a reciprocating poppet according to one embodiment of the present invention.

In contrast to a rotating pulser valve, the hydraulic forces acting on an axially reciprocating pulser valve are more dependent on the pressure drop across the pulser valve. The pressure drop across the pulser valve is directly proportional to the fluid properties, typically density and viscosity, the fluid flow rate, and inversely proportional to the flow area through the nozzles, main 125 and bypass 115. To compensate these hydraulic forces, a force balancing spring 105 is disposed between the end cap 150 and the magnet carrier 135. The spring force is used to offset the hydraulic forces at a nominal operating flow rate. For example, FIG. 3 shows the typical forces acting on the reciprocating valve at a reciprocating frequency of 40 Hz and a nominal flow rate of 2000 liters per minute. The main forces acting on the poppet are the hydraulic forces 301, primarily due to the pressure drop created; the dynamic force 302 caused by the acceleration of the masses; and the counterbalancing spring force 303. By adding these forces, the spring force 303 compensates most of the hydraulic forces 301 such that the total pulser force 304 is approximately equal to the dynamic force 302 which requires less force, and hence less power, than a reciprocating valve without a compensating spring.

Downhole tools, including pulser valves, must operate over a range of flow rates and fluid properties. For example, with a constant flow area, as the flow rate and/or fluid viscosity or fluid density are increased, the pressure drop will increase, and hence the hydraulic forces acting on the poppet will increase thereby changing the desired balance of forces on the poppet 103. In order to provide for these operational changes, at least one of the bypass nozzles 115 has a bypass poppet 160, see FIG. 2, mounted downstream of the nozzle assembly 102 and located so that the bypass poppet 160 can be driven by actuator 165 toward or away from the bypass nozzle 115, to reduce or enlarge the effective flow area of the nozzle assembly 102, thereby controlling the nominal pressure drop across the nozzle assembly 102. By controlling the pressure drop across the nozzle assembly 102, the hydraulic forces on the main poppet 125 can be maintained at an essentially constant value. The bypass poppet actuator 165 can be a linear motor or a conventional motor driven ball-screw actuator. These actuators are commercially available and are not discussed further.

Referring to FIG. 2, pressure sensors 112a and 112b are mounted upstream and downstream of the nozzle assembly 102, respectively, such that they can measure the fluid pressure in the fluid flowing inside the tool housing 101. The pressure sensors 112a,b are powered and controlled by electronics module 145. In one embodiment, a processor in the electronics module 145, according to programmed instructions, uses the pressure signals from pressure sensors 112a,b to generate a differential pressure value across the nozzle assembly 102. The processor, according to programmed instruction, modifies the position of the bypass poppet 160, with respect to the bypass nozzle 115, so as to maintain a predetermined differential pressure across the nozzle assembly 102. In another embodiment, the pressure sensors 112a,b sense pressure command signals transmitted from a surface location. The processor then, according to programmed instructions, modifies the signal encoding scheme to provide improved data transmission to the surface.

The electronics module 145 may contain a programmable processor which can be programmed to transmit data utilizing any of a number of encoding schemes which include, but are not limited to, Amplitude Shift Keying (ASK), Frequency Shift Keying (FSK), or Phase Shift Keying (PSK) or the combination of these techniques. The processor in the electronics module 145 may be programmed to alter the data encoding parameters based on surface transmitted pulses. The encoding parameters can include type of encoding scheme, baseline pulse amplitude, baseline frequency, or other parameters affecting the encoding of data.

The above described linear motor drive system provides precise control of the axial position of the poppet 103 with respect to the position of the main nozzle 125. Such precise control allows the improved use of several encoding schemes common to the art of mud pulse telemetry.

With the reciprocating spring balanced pulser system, the encoding or switching between phase, frequency, or amplitude does not require high actuation power, because the hydraulic forces are always balanced in any poppet position. Starting from the zero speed level a phase, frequency, or amplitude change does not substantially affect the overall power consumption, because the dynamic forces are zero at zero speed. In a embodiment, the main power is used to drive the system at a high frequency level. Once it is capable of creating a high frequency it can switch to another one almost immediately. This quick change gives a very high degree of freedom for encoding of telemetry data. The characteristic used for the encoding (frequency, phase or amplitude change) can be switched from one state to a second state, thereby transmitting information, within one period or less. No transition zone is needed between the different levels of encoded information. Hence there will be more information content per time frame in the pressure pulse signal of the reciprocating spring balanced pulser than with a conventional pulser.

Figure 4:
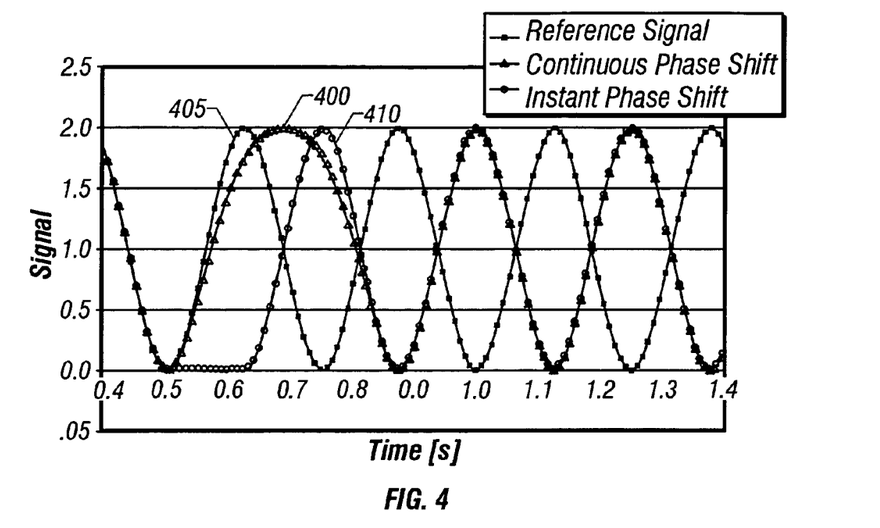
FIG. 4 is schematic which describes Phase Shift Key encoding using a reciprocating valve according to one embodiment of the present invention.

FIG. 4 displays a graph which shows Phase Shift Key encoding of the reciprocating valve as compared to a continuously rotating shear valve. The continuous phase shift signal 400 requires 1½ signal periods of the reference signal 405 to achieve a full 180° phase shift. In the transition time between 0.5 s and 0.9 s the information of the continuous phase shift signal 400 can not be used because it contains multiple frequencies. With the reciprocating valve, the linear motor allows the poppet to be phase shifted at essentially any time thereby effectively providing an essentially instant phase shift. As shown in FIG. 4, the reciprocating valve phase shift signal 410 starts at 0.5 s already in the proper phase shifted relationship with the reference signal 400 such that the following signal period can already be used for encoding purposes. Thus, there is more information per time frame with a phase shift keying signal generated with an reciprocating valve than with a continuously rotating shear valve.

Figure 5:
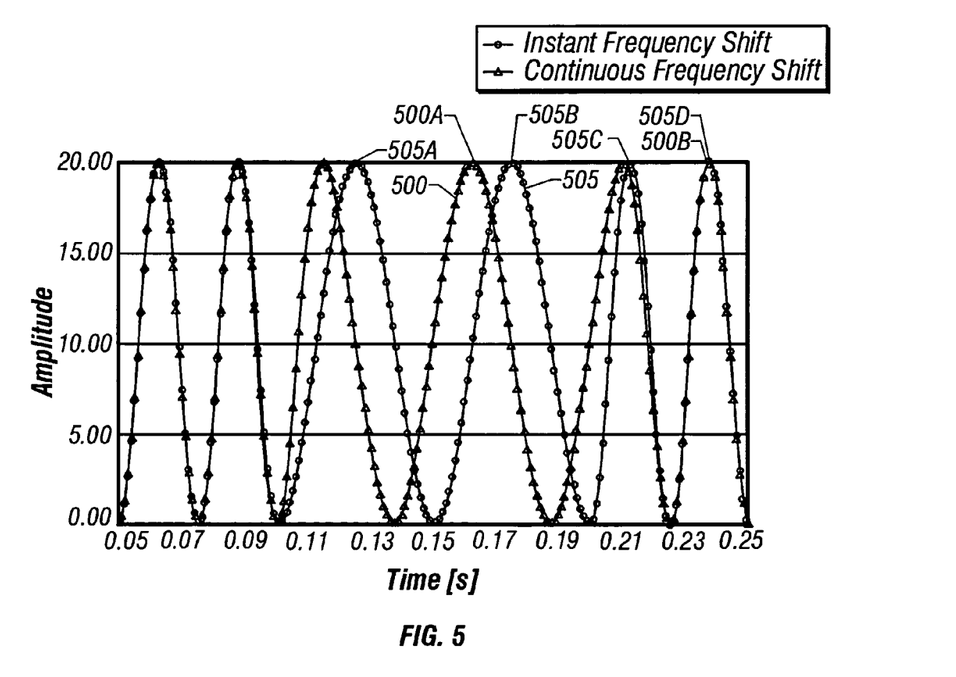
FIG. 5 is a schematic which describes Frequency Shift Key encoding using a reciprocating valve according to one embodiment of the present invention.

FIG. 5 displays a graph showing a Frequency Shift Keying signal of the reciprocating valve compared to a signal of a continuously rotating shear valves using the same encoding scheme. This example shows a frequency shift from 40 Hz to 20 Hz and back to 40 Hz. At 0.10 s the frequency is shifted from 40 Hz to 20 Hz, with the signal 500 from the continuously rotating shear valve, shifting only one full amplitude 500a of the low frequency at 0.16 s before it must shift back to the high frequency signal at 500b. Only the peaks at 500a and 500b are suitable for encoding information. The transition periods before and after the frequency shift contain multiple frequencies which can not be used for coding purposes. With the signal 505 from the reciprocating valve, there are still two fully usable amplitudes 505a and 505b at the lower frequency and two usable peaks at the higher frequency 505c and 505d. As with phase shift keying, there is more information content per time frame with the reciprocating valve than with a continuously rotating shear valve. This can provide higher detection reliability by providing more cycles to lock onto, or alternatively the frequency changes can be more rapid, thereby increasing the data rate, or a combination of these.

An Amplitude Shift Key (ASK) signal can be easily generated with the reciprocating valve of the present invention. The signal amplitude is proportional to the amount of flow restriction and thus is proportional to the amount of linear motion, or travel, of the poppet 103 bringing it in proximity to the main nozzle 125. The poppet position can be continuously controlled and, therefore, the amplitude of each cycle can be different as the motor 104 can accurately move the poppet 103 through a different travel on each cycle according to programmed control from the electronics module 145.

Figure 6:
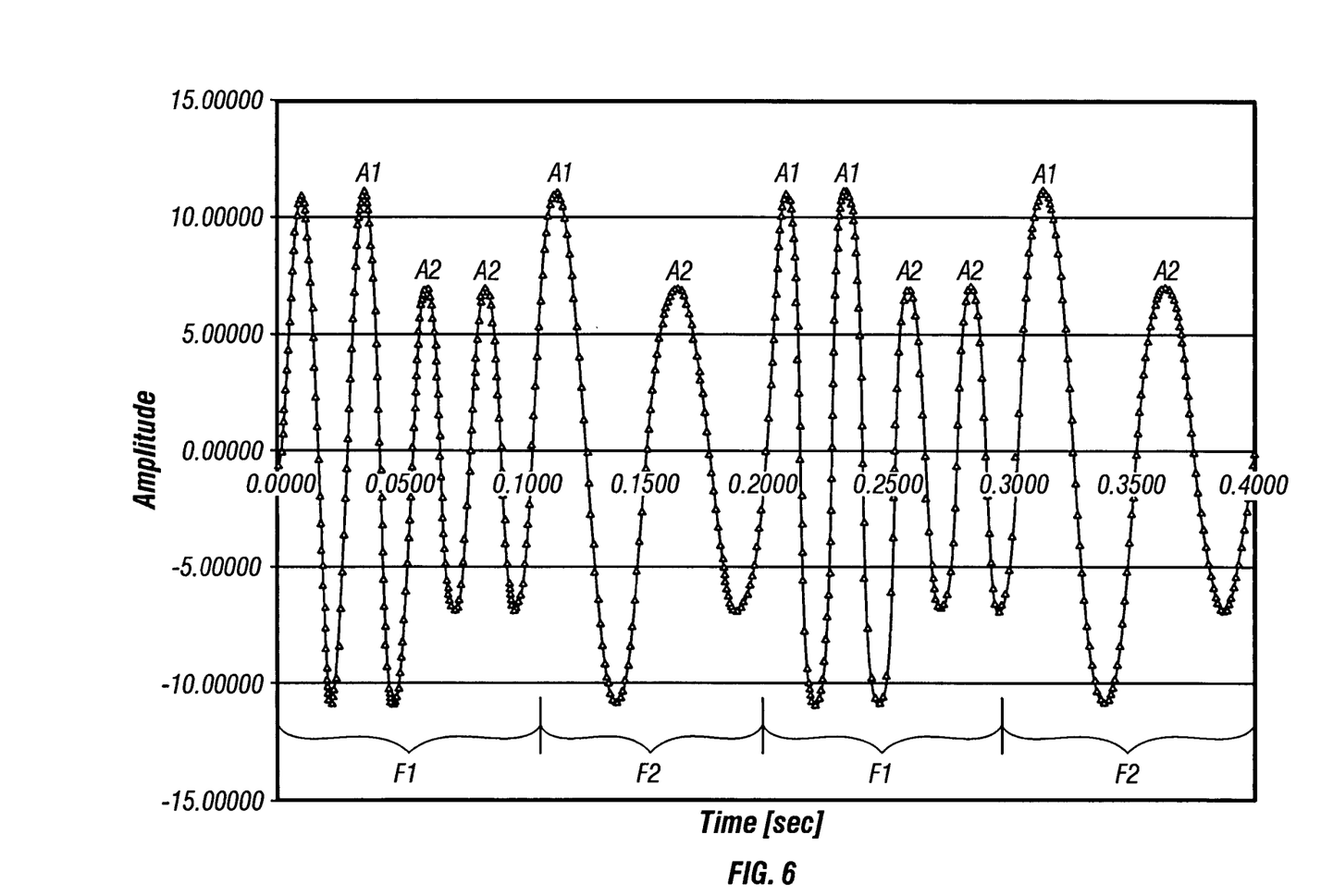
FIG. 6 is a schematic which describes a combination of Frequency Shift Key and Amplitude Shift Key encoding using a reciprocating valve according to one embodiment of the present invention.

In addition, because the poppet 103 can be continuously and accurately controlled, combinations of ASK and FSK or ASK and PSK may be used to encode and transmit multiple signals at the same time, greatly increasing the effective data rate. FIG. 6 is a schematic showing one scheme for combining an ASK and an FSK encoded signal. Both signals are carried out in a constant phase relationship with an amplitude shift from A1 to A2 or from A2 to A1 representing data bits of a first encoded signal and the frequency shifts from F1 to F2 or from F2 to F1 representing data bits of a second encoded signal. This type of signal is generated by changing both the reciprocating frequency of the poppet 103 and simultaneously changing the poppet 103 travel, as previously described. Similarly, a signal combining ASK and PSK encoding (not shown) can be generated by changing the phase relationship of a constant frequency signal while simultaneously changing the amplitude by changing the poppet 103 travel. Here, the amplitude shifts represent a first encoded signal and the phase shifts represent a second encoded signal.

Figure 7:
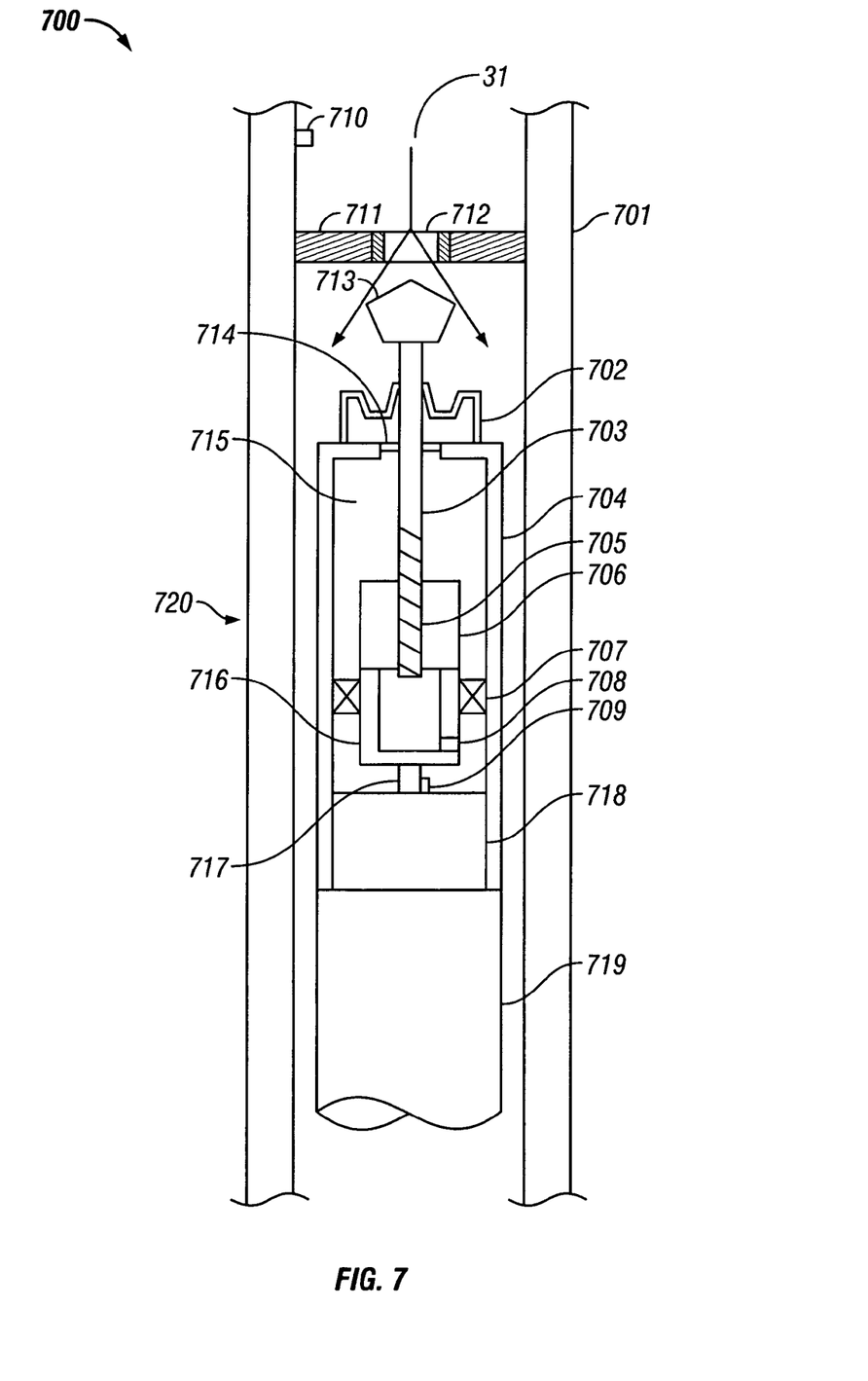
FIG. 7 is a sketch of a pulser system according to one embodiment of the present invention.
Figure 8:
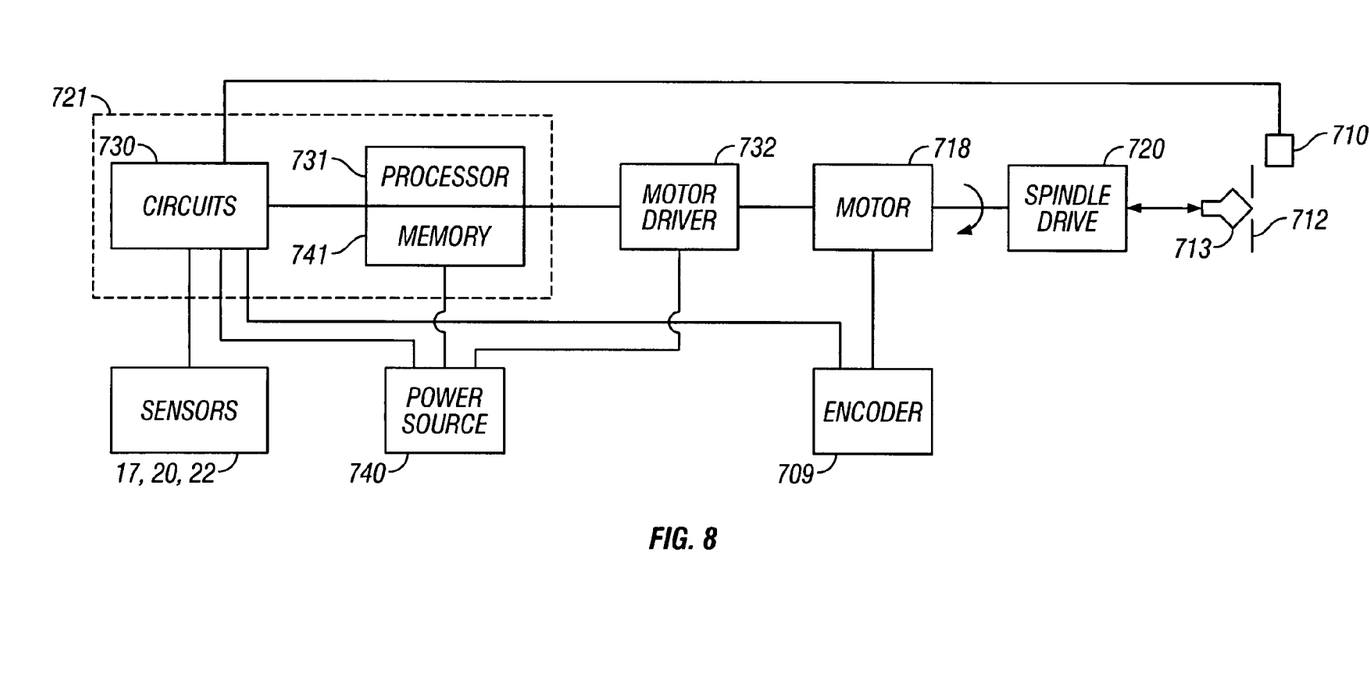
FIG. 8 is a block diagram of the pulser system of FIG. 7.

Another embodiment of a reciprocating pulser is shown in FIGS. 7 and 8. Pulser 700 is located in housing 701 that is disposed in BHA 10 (see FIG. 1). Nozzle support 711 having nozzle 712, also commonly called an orifice, is disposed in housing 701. Drilling fluid 31 is forced to flow through nozzle 712 and through the annulus between pulser assembly 700 and housing 701. Poppet 713 of pulser 700 is axially actuated to move toward and away from nozzle 712 and thereby at least partially obstruct the flow through nozzle 712. The change in the flow caused by such obstruction generates related pressure fluctuations in fluid 31, as described previously, that propagate to the surface and are detected. Pulser 700 comprises reversible motor 718 having shaft 717 coupled to spindle drive system 720 and disposed in pulser housing 704 and act cooperatively as a linear actuator. Spindle drive system 720 comprises spindle 716, drive nut 706, and threaded poppet shaft 703, and basically converts the rotational motion of shaft 717 into axial motion of poppet 713. Spindle 716 is guided by bearing 707. Spindle 716 is coupled to, and rotates, drive nut 706. Drive nut 706 engages threads 705 on poppet shaft 703 such that rotation of drive nut 706 axially extends or retracts poppet 713 depending on the direction of rotation of motor 718. The internal volume of housing 704 is filled with a suitable electrically insulating lubricant 715 that serves to lubricate the moving surfaces and to pressure equalize the inside of housing 704 with the external downhole pressure. Lubricant 715 also fills the cavities internal to spindle drive 720. In one embodiment, the flow of lubricant 715 is controlled as it escapes form spindle 716 by valve 708. This flow control also acts as a hydraulic cushion to prevent hydraulic forces on poppet 713 from over powering the motor during poppet retraction. It will be appreciated by one skilled in the art, that motor 718 may be directly coupled to shaft 703 such that rotation of shaft 703 axially displaced drive nut 706 that can be configured to extend and retract poppet 713. It is intended that the present invention cover such alternative design choices.

Flexible seal 702 is attached to shaft 703 and to an end surface of housing 704 and effects a seal between the wellbore fluid and lubricant 715. The flexible nature of seal 702 accommodates the repeated extension and retraction of poppet 713. Flexible seal 702 is similar in function and material to seal 107 previously described. Alternatively, lip seal 714 is used to seal between downhole fluid and lubricant 715.

In one embodiment, motor 718 is a controllable brushless DC motor. Such motors and their associated motor controllers, and/or control circuits, are commercially available, and/or known in the art, and are not described in detail here. Alternatively, motor 718 is a stepper motor. Again, such motors and their associated motor controllers, and/or control circuits are commercially available, and/or known in the art, and are not described in detail here. Such motors and controllers, as used herein, provide essentially continuous, precise control of the axial position of poppet 713 and its relative position to nozzle 712. This continuous precise control provides the ability to control various operating characteristics of interest of the generated pulses. These characteristics of interest include, but are not limited to, pulse amplitude, pulse frequency, pulse duration, and pulse phase with respect to a reference phase. Alternatively, a gear drive 801, see FIGS. 9A,B, may be included on the output of motor 718 to increase the torque available to actuate the pulser. Gear drive 801 may be a planetary gear drive or any other suitable gear drive.

In one embodiment, a sensor (not separately shown) is integral with the motor and provides a signal that can be used to relate the motor rotation to the position of poppet 713. In another embodiment, sensor 709, which may be an encoder, is external to motor 718 and produces a signal related to the rotation of motor shaft 717. Such encoders are commercially available and not described in detail herein. As shown in FIG. 8, a signal from encoder 709 may be used by controller 721 to control the motion of motor 718 and, therefore, the motion of poppet 713, and a characteristic of the generated pulses. These characteristics of interest include, but are not limited to, pulse amplitude, pulse frequency, pulse duration, and pulse phase with respect to a reference phase.

Module 719 provides a housing suitable for location of electronic circuits and components for controlling the pulser operation. Contained in module 719 is a pulser controller 721 (see FIG. 8) comprising circuits 730 and processor 731 having a memory 741. Controller 721 receives signals from sensors 17, 20, 22 (see FIG. 1) related to downhole parameters of interest that are to be transmitted to the surface. Such signals are encoded by processor 731 and suitably encoded for transmission according to programmed instructions in memory 741 and the appropriate signals sent to motor driver 732 for actuating motor 718, as required. The rotational output of motor 718 is translated to axial motion of poppet 713 by spindle drive 720. Hermetically sealed connectors may be used to transfer signals into and out from housing 719. Power source 740 is a drilling fluid powered turbine-alternator (not separately show) in BHA 10 and appropriately connected to pulser 700 using techniques known in the art. Alternatively, power source 740 may be a battery pack (not separately shown), and/or a combination of a turbine alternator and a battery pack.

Sensor 710 is located above orifice 712 and detects the generated pressure signals. In one embodiment, sensor 710 is a dynamic pressure sensor. Such sensors do not detect long term static changes in system pressure, but rather detect the pressure pulsations such as those generated by the present invention. Such dynamic pressure sensors are commercially available. In one embodiment, the dynamic pressure sensor is a hydrophone. Alternatively, sensor 710 may be a flow sensor that detects flow changes related to the downhole generated pressure fluctuations.

The sensed pressure signals detected by sensor 710 may be used by controller 721 in a feedback loop to adjust the motion of poppet 713 to produce a desired pulse characteristic, such as, for example, a desired magnitude, also called pulse amplitude. In addition, sensor 710 may be used to control and/or alter pulse shape, pulse duration, pulse frequency, pulse phase, and/or combinations of these parameters to transmit data. In one embodiment, the downhole pulser 700 acts autonomously to control pulse characteristics and encoding techniques based on instructions programmed into controller 721 prior to deployment.

In another embodiment, sensor 710 is used to detect signals sent from the surface to the downhole system. The signals from the surface are encoded pressure pulses containing information to provide commands and/or instructions to controller 721 to alter pulse characteristics, encoding techniques, and operational characteristics of the sensor modules 17, 20, 22. The information from the surface may direct controller 721 to change a particular pulse characteristic. Alternatively, the information may direct the controller to initiate a preprogrammed sequence of changes, for example, to step through a predetermined sequence of pulse frequencies in order to improve surface detection. Additional information may then be transmitted from the surface to specifically set the frequency that provided the best surface reception.

In another embodiment, a combination of normally autonomous control and operation may be used. For example, autonomous downhole operation may be overridden by downlinked surface information, as previously described.

While the downlinked information has been previously described as pressure and/or flow pulsations, any downlinking techniques known in the art may be used with the present invention. These include, but are not limited to: changes in drill string rotation; drilling fluid flow indicated by changes in RPM of the turbine-alternator; and starting and stopping of surface pumps as detected, for example, by the output of the turbine-alternator. In addition, the downlinked information may contain instructions for the operation and control of other tools in BHA 10, such as, for example, tools (not separately shown) for adjusting and or controlling the drilling direction of BHA 10.

Figure 9A:
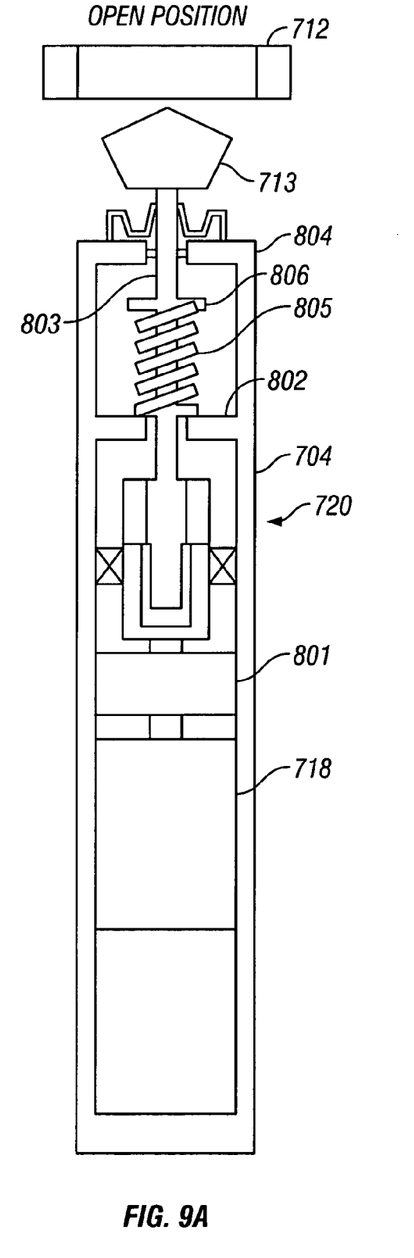
FIGS. 9A,B are sketches of a pulser system having a spring assist for poppet extension according to one embodiment of the present invention.
Figure 9B:
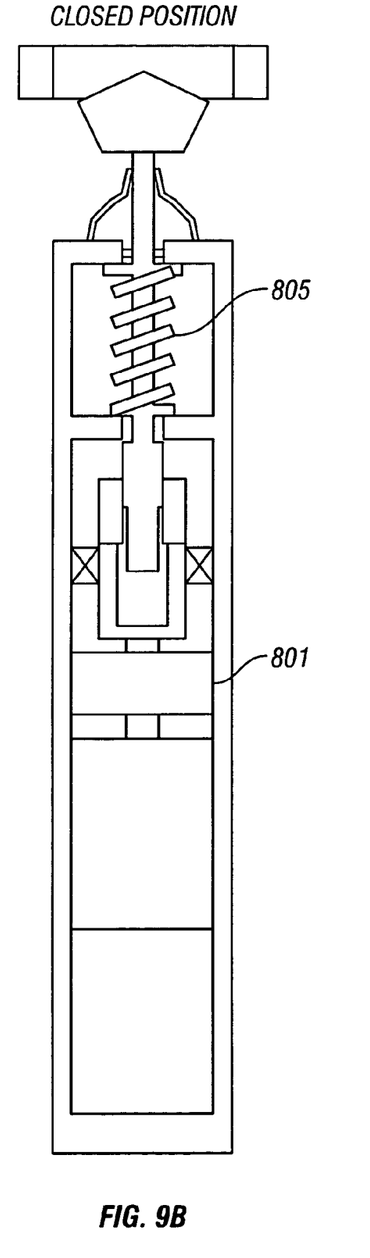
Figure 11A:
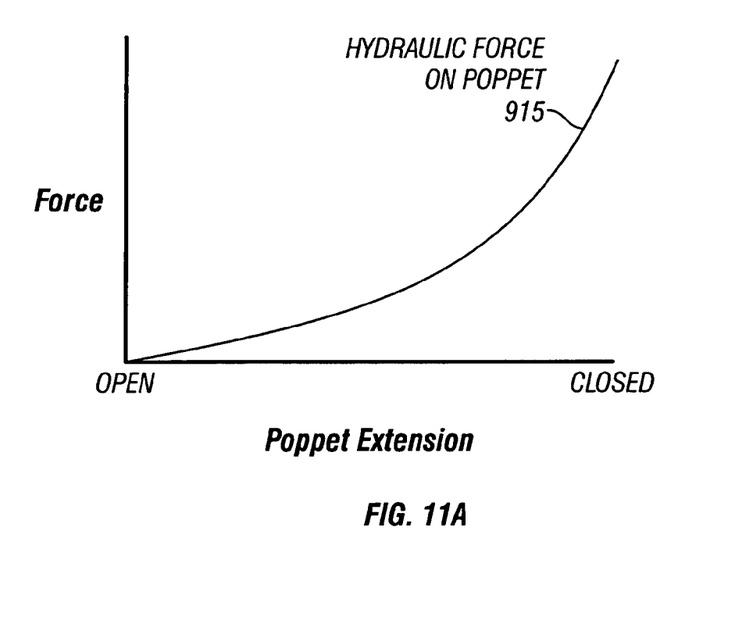
FIG. 11A is a graph of Hydraulic Force on a Poppet vs. poppet extension.
Figure 11B:
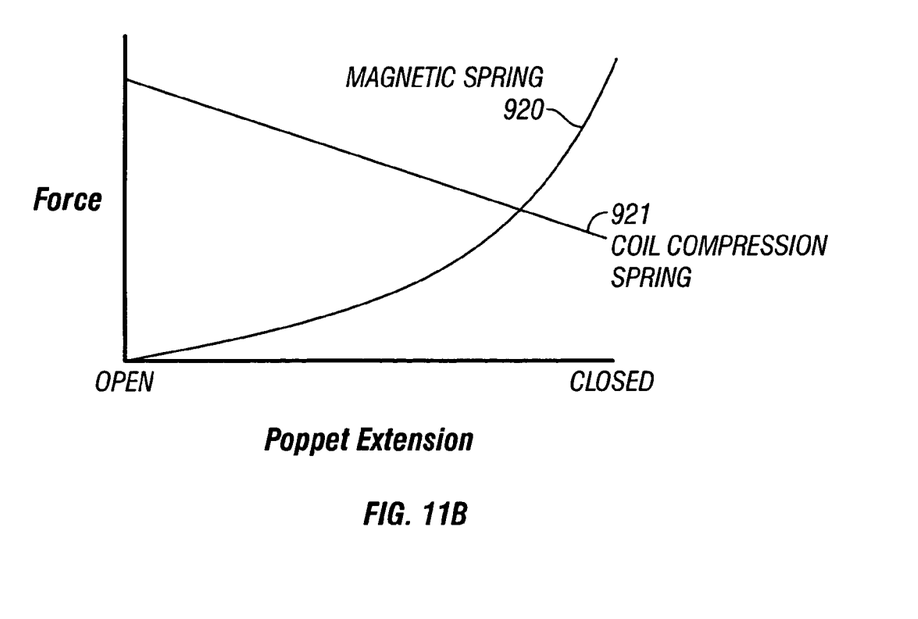
FIG. 11B is a graph of Spring Force vs. Poppet Extension for both a coil spring and a magnetic spring.

In another embodiment, shown in FIGS. 9A,B, a compression spring 805 is positioned in housing extension 804 and is captured between shoulder 802 and retainer 806 attached to shaft 803. Spring 805 is in a preloaded condition when poppet 713 is in the open, also called the retracted position, as shown in FIG. 9A. The hydraulic forces on poppet 713 during extension are shown in FIG. 11A, curve 915, as increasing in a non-linear fashion as poppet 713 extends toward the closed position. It will be appreciated by one skilled in the art that the poppet 713 does not completely close, or seat, in nozzle 712. In order to reduce the load on motor 718 and the downhole power source. Spring 805 provides additional extension force to overcome a portion of the hydraulic forces on poppet 713 as poppet 713 extends from the open to the closed position and relieves some of the energy required from motor 718. The force available from a common coil compression spring is shown in FIG. 11 B, curve 921. As can be seen there, the available load from the initially compressed spring is greatest when the spring is just opening, and least when the poppet approaches maximum extension. Therefore, a coil spring provides the least force when the hydraulic loads are greatest.

Figure 10:
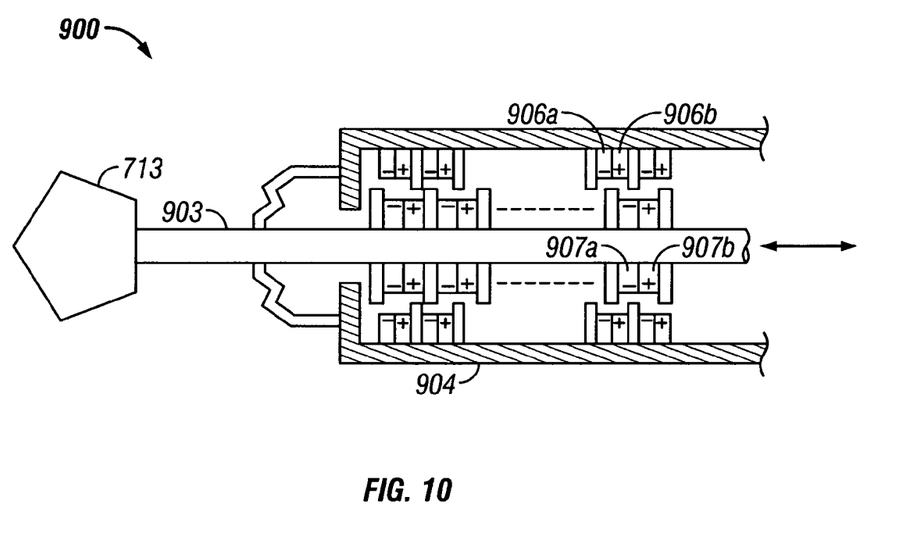
FIG. 10 is a sketch of a magnetic spring according to one embodiment of the present invention.

Magnetic spring 900, see FIG. 10, provides an available force vs. extension characteristic more suited to the poppet extension. Magnetic spring 900 comprises annular disc magnets 907a,b positioned on shaft 903, and disc magnets 906a,b positioned inside housing 904. Disc magnets 907a,b and 906a,b are radially polarized such that the internal and external diameter surfaces of the disc have opposing polarity, and such that discs 906a and 906b have opposite polarities. Similarly, discs 907a and 907b have opposite polarities. As shown in FIG. 10, the magnets are arranged in housing 904 and on shaft 903 in pairs such that adjacent discs have alternating polarity. In the retracted, or open, position like poles of discs 906a,b and 907a,b are juxtaposed with each other. Similar to those of a magnetic bearing. One skilled in the art will appreciate, that in such a position, there is substantially no axial force acting on shaft 903 by magnetic spring 900, as shown by the curve of magnetic spring force vs. poppet extension in FIG. 11B. As shown in FIG. 11B, the relative displacement of magnet pair 907a,b with respect to pair 906a,b tends to move opposing poles in line with one another and increases the axial force on shaft 903 according to curve 920. Curve 920 shows that the force available from magnetic spring 900 is also non-linear. Through proper sizing of the magnets, and number of magnets, the force from magnetic spring 900 can be tailored to more closely match the required force due to hydraulic force 915 and substantially reduce the power required to drive shaft 903. The design of such a spring is within the state of the art using analytical and/or numerical techniques without undue experimentation.

It is to be understood that all of the pulsers described herein are capable of providing precise position control of a poppet with respect to a nozzle to generate pulses. The precise control allows the pulser to use any of the encoding techniques, such as ASK, FSK, PSK, and combinations thereof, as described herein.

The foregoing description is directed to particular embodiments of the present invention for the purpose of illustration and explanation. It will be apparent, however, to one skilled in the art that many modifications and changes to the embodiment set forth above are possible. It is intended that the following claims be interpreted to embrace all such modifications and changes.

What is claimed is:

1. A method of transmitting pressure pulses through a flowing fluid in a wellbore, the method comprising:
    placing a pulser in the flowing fluid, the pulser including a fluid passage that allows flow of the fluid through the pulser, a reciprocating member, a drive system and a motor; and
    rotating the motor to cause the drive system to convert rotary motion of the motor into axial motion of the reciprocating member to move the reciprocating member between a first position and a second position to at least partially obstruct flow of the flowing fluid to generate the pressure pulses.

2. The method of claim 1, further comprising substantially continuously controlling the movement of the reciprocating member by the motor.

3. The method of claim 1, further comprising rotating a spindle coupled to the motor to move the reciprocating member.

4. The method of claim 3, wherein the motor is chosen from the group consisting of: (i) a DC motor, and (ii) a stepper motor.

5. The method of claim 2 further comprising substantially continuously controlling movement of the reciprocating member to control a characteristic of the pressure pulses.

6. The method of claim 5 wherein the characteristic of the pressure pulses is selected from a group consisting of (i) an amplitude of the pressure pulses, (ii) a frequency of the pressure pulses, (iii) a shape of the pressure pulses; and (iv) a phase of the pressure pulses.

7. The method of claim 1 further comprising directly coupling a linear actuator to the reciprocating member.

8. The method of claim 5 further comprising controlling the characteristic of the pressure pulses in response to one of (i) a downhole measured parameter, (ii) according to instructions stored in a downhole controller, (iii) a pressure measured downhole, (iv) information sent from a surface location, and (v) rotation of the motor.

9. The method of claim 2 further comprising controlling the movement of the reciprocating member to encode information to be transmitted to the surface according to an encoding scheme chosen from the group consisting of: (i) an amplitude shift key scheme; (ii) a frequency shift key scheme; (iii) a phase shift key scheme; (iv) a combination of an amplitude shift key scheme and a frequency shift key scheme; and (v) a combination of an amplitude shift key scheme and a phase shift key scheme.

10. The method of claim 1, further comprising providing a spring acting cooperatively with a linear actuator coupled to the motor to reduce power required to move the reciprocating member.

11. The method of claim 10, wherein the spring is chosen from a group consisting of: (i) a coil spring, and (ii) a magnetic spring.

12. A reciprocating pulser for generating pressure pulses in a fluid flowing in a wellbore, comprising:
    a fluid passage that allows flow of the fluid through the pulser;
    a reciprocating member; and
    a motor coupled to a drive system, wherein the drive system converts rotary motion of the motor into linear motion of the reciprocating member to move the reciprocating member in a first direction and a second reverse direction to at least partially obstruct flow of the fluid through the pulser to generate the pressure pulses in the fluid.

13. The reciprocating pulser of claim 12 further comprising a controller that controls the motor to substantially continuously control movement of the reciprocating member.

14. The reciprocating pulser of claim 12, further comprising a spindle connected to the motor that rotates the reciprocating member.

15. The reciprocating pulser of claim 14, wherein the motor is chosen from the group consisting of: (i) a DC motor, and (ii) a stepper motor.

16. The reciprocating pulser of claim 13 wherein the controller controls the motor in response to one of (i) a sensor providing information about a position of the reciprocating member, (ii) a pressure measured downhole, (iii) a signal sent from a surface location, (iv) instructions associated with the controller, and (v) rotation of the motor.

17. The reciprocating pulser of claim 12 wherein a linear actuator is directly coupled to the reciprocating member.

18. The reciprocating pulser of claim 12 wherein the reciprocating member is a poppet that acts cooperatively with a nozzle in the pulser to obstruct the fluid flowing through the nozzle in the pulser.

19. The reciprocating pulser of claim 14, further comprising a gear drive acting cooperatively with the motor and the spindle to rotate the reciprocating member.

20. The reciprocating pulser of claim 13, wherein the controller continuously controls movement of the reciprocating member to control a characteristic of the pressure pulses.

21. The reciprocating pulser of claim 20 wherein the characteristic of the pressure pulses is selected from a group consisting of (i) an amplitude of the pressure pulses, (ii) a frequency of the pressure pulses, (iii) a shape of the pressure pulses; and (iv) a phase of the pressure pulses.

22. The reciprocating pulser of claim 12, further comprising a spring acting cooperatively with a linear actuator to reduce power required to move the reciprocating member.

23. The reciprocating pulser of claim 22, wherein the spring is chosen from a group consisting of: (i) a coil spring, and (ii) a magnetic spring.

24. The reciprocating pulser of claim 12, further comprising a seal configured to prevent the flowing fluid to penetrate into the motor.

25. The reciprocating pulser of claim 24, wherein the seal is chosen from the group consisting of (i) a lip seal, and (ii) a bellows seal.

26. The reciprocating pulser of claim 25, wherein the bellows seal is made from a material chosen from the group consisting of: (i) an elastomeric material, and (ii) a metal material.

* * * * *